Aug. 7, 1962 C. BLEIBERG 3,047,970

PLASTIC PAPERWEIGHT AND CARD HOLDER

Filed Nov. 14, 1960

INVENTOR

Carl Bleiberg

BY Robert Van Sickler

ATTORNEY

United States Patent Office 3,047,970
Patented Aug. 7, 1962

3,047,970
PLASTIC PAPERWEIGHT AND CARD HOLDER

Carl Bleiberg, 8500 16th St., Silver Spring, Md.
Filed Nov. 14, 1960, Ser. No. 69,065
3 Claims. (Cl. 40—10)

This invention relates to a plastic paperweight with which is associated a photograph or advertising material and more particularly to the type allowing the easy insertion and removal of such advertising matter, photograph or other card material.

It is an object of my invention to enable the inserted material to be viewed through the transparent or translucent plastic material.

A further object is to provide a depressed area to receive a card or photograph of an appropriate dimension.

Another objective is to maintain the card in a secure position so to preclude accidental removal.

An additional object is the provision of a longitudinally extending channel in the lower face to receive the bent or folded edge of a card.

A further object is to permit the easy insertion and the subsequent removal of the card or photograph.

A still additional objective is to insure the retention of the card of photograph without the use of an adhesive.

It is also an object to enable the retained photograph or card to be inserted or removed with the minimum of handling by the provision of additional access thereto.

With the foregoing and other objects in view which will be apparent from the following description and accompanying drawings, it being the intention to cover all possible changes and modifications without departing from the spirit of the invention and the scope of the appended claims.

FIGURE 4 is an enlarged sectional view taken on the line 4—4 of FIGURE 1, while

Figure 1:
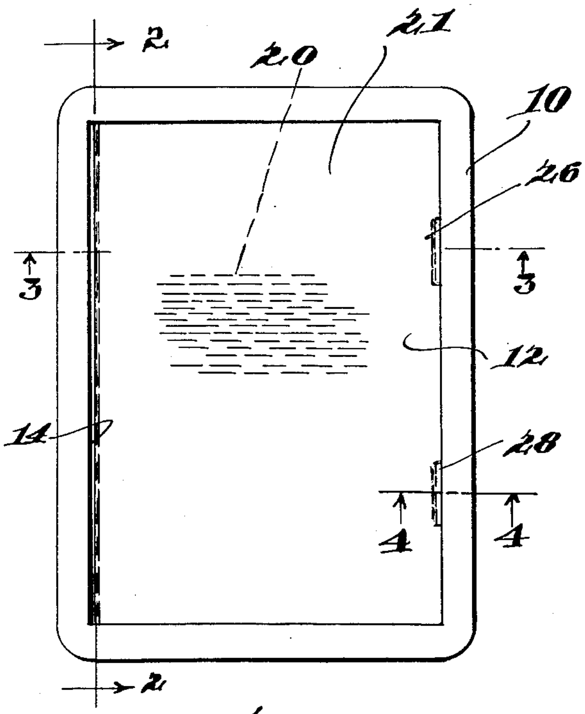
FIGURE 1 is a bottom plan view of the plastic paperweight showing a card in position.
Figures 2, 5:
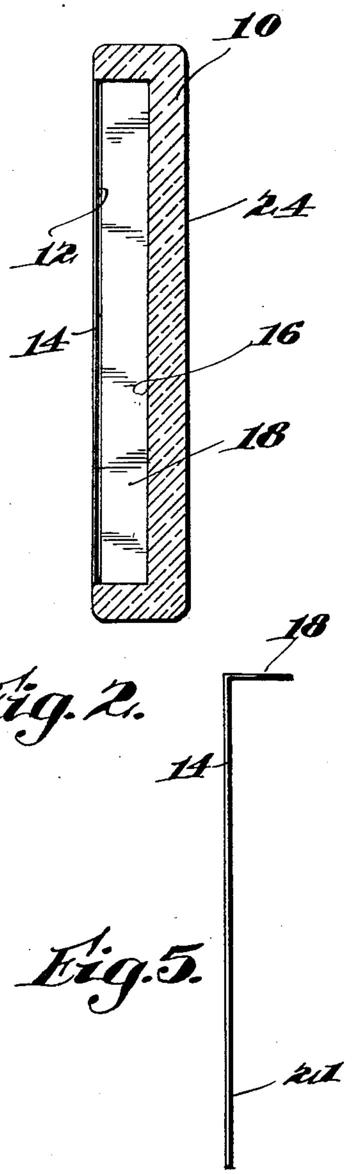
FIGURE 2 is a vertical sectional view taken on the line 2—2 of FIGURE 1.
FIGURE 5 is an end view of a card.

In the drawings where like reference characters denote corresponding parts, the numeral 10 refers to the plastic paperweight, of general rectangular formation. The main central portion 12 on the bottom is recessed, the depth of the depression being slightly greater than the thickness of the card 14 that is to be used. A longitudinally extending channel 16 of an appreciable depth is formed on the longer length on one side edge of the main recessed portion 12.

The card or photograph 14, of a length comparable to that of the central depressed portion 12, and flange of a length about equal to that of the depth of the channel 16, is adapted to be readily positioned and secured in relation to the paperweight 10. The card 14 is adapted to have this right angular flange or bent portion 18 inserted into the longitudinal channel 16 and the main portion of the card fitting well into the recessed portion, flush with the plane of the top edges.

Figure 3:
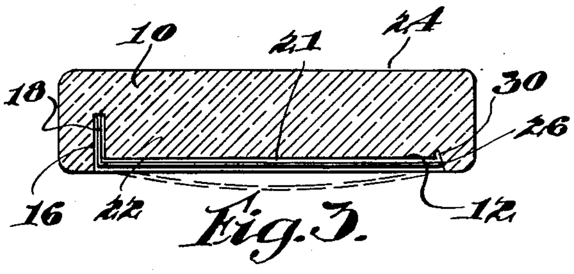
FIGURE 3 is a horizontal sectional view taken on the line 3—3 of FIGURE 1.
Figure 4:
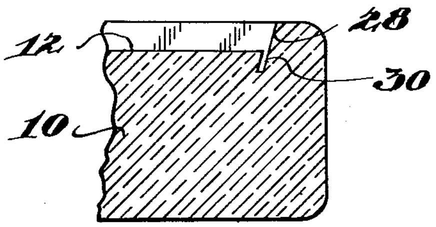

In inserting the card 14, after the flange 18 has been tightly inserted into the channel 16 with the enscribed matter on the lower face 21, the card or photograph 14 is flexed, as shown in FIGURE 3, in dotted lines, to enable the enscribed data to be viewed from or through top 24 of the transparent material.

Additional notches or grooves 26 and 28 are provided which extend, as at 30, a slight depth below the large central recessed portion 12 at the indicated spaced locations. It is to be noted that these grooves or slots 26 and 28 slant or taper inwardly and it can be appreciated that these depressions facilitate the easy removal of a card permitting the nail of a finger to be inserted behind and below the card which fitted tightly into the main recessed area. Also, it is to be observed that due to the simple insertion and extraction of a card or photograph, the minimum of soiling results.

It can be further appreciated that the card may support a photograph or may have advertising or other data enscribed thereon. Obviously, when the paperweight is placed on a table or desk, the photograph or advertising legend may be clearly observed. It will also be obvious that the subject construction enables the card or photograph to be changed at will with the minimum of handling. By comparison, the conventional paperweights have cards and the like permanently attached or embedded therein or the cards are adhesively attached to the surface and as a result cannot be easily replaced or changed as in the case of the subject invention.

In the present invention it is also to be observed that in addition to the above noted uses, it is also contemplated that prints of famous paintings and other works of art may be inserted or retained in the recessed portions of the subject picture-weights.

I claim:

1. In an article of the class described, a transparent plastic paperweight having a card receiving recessed area with a longitudinal channel formed therein on one side thereof, a card bearing enscribed matter on its lower face and having a short right angular flange on an edge thereof, said flange being adapted to be retained in said channel with the major portion adapted to be received in the recessed area with the card edge opposite from said flange being positioned in abutting relation with a wall of the recessed area, and said recessed area being of a depth whereby said card when positioned tightly therein will lie in the approximate plane as the bottom edges of said paperweight.

2. In an article of the class described, a transparent plastic paperweight having a card receiving recessed area with a longitudinal channel formed therein on one side, a card bearing enscribed matter on its lower face and having a short right angular flange on an edge thereof, said flange being adapted to be retained in said channel with the major portion adapted to be received in the recessed area with the card edge opposite from said flange being positioned in abutting relation with a wall of the recessed area, said recessed area being of a depth whereby said card when positioned tightly therein will lie in the approximate plane of the lower edges of said paperweight, and a plurality of spaced recessed slots opposed from said channel whereby said card may be readily engaged and removed.

3. In an article of the class described, a transparent plastic paperweight having a card receiving recessed area with a longitudinal channel formed therein on one side, a card bearing enscribed matter on its lower face and having a short angular flange on an edge thereof, said flange adapted to be retained in said longitudinal channel with the major portion flatly received in said recessed area with the card edge opposite from said flange being positioned in abutting relation with a wall of said recessed area, said recessed area being of a depth whereby when card is tightly positioned therein it will lie in the approximate plane with the lower edges of said paperweight, and a plurality of spaced inwardly tapering slots opposed from said longitudinal channel whereby said card may be readily engaged and removed.

References Cited in the file of this patent

UNITED STATES PATENTS

| | | |
|---|---|---|
| 436,665 | Krell | Sept. 16, 1890 |
| 572,956 | Bonney | Dec. 15, 1896 |
| 1,229,877 | Bronner | June 12, 1917 |